(12) United States Patent
Sato

(10) Patent No.: US 6,950,125 B1
(45) Date of Patent: Sep. 27, 2005

(54) CAMERA-PRINTER SYSTEM

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/288,109

(22) Filed: Apr. 8, 1999

(30) Foreign Application Priority Data

Apr. 10, 1998 (JP) ............................... P10-099126

(51) Int. Cl.$^7$ .......................................... H04N 5/225
(52) U.S. Cl. ................................ 348/207.2; 358/909.1
(58) Field of Search ........................ 348/207.99, 207.2, 348/373, 375, 231.9; 358/401, 448, 909.1, 358/1.13, 442, 906

(56) References Cited

U.S. PATENT DOCUMENTS

| | | | |
|---|---|---|---|
| 4,937,676 A * | 6/1990 | Finelli et al. ................ | 348/375 |
| 4,942,477 A * | 7/1990 | Nakamura ................... | 358/401 |
| 5,499,113 A * | 3/1996 | Tsuboi et al. ............... | 358/448 |
| 5,606,420 A * | 2/1997 | Maeda et al. ............. | 358/909.1 |
| 5,835,136 A * | 11/1998 | Watanabe et al. ........ | 348/231.9 |
| 6,094,282 A * | 7/2000 | Hoda et al. ............... | 358/909.1 |
| 6,229,565 B1 * | 5/2001 | Bobry .................... | 348/207.99 |

FOREIGN PATENT DOCUMENTS

| | | |
|---|---|---|
| EP | 0825758 | 2/1998 |
| JP | 10-66015 | 6/1998 |
| JP | 10271377 | 10/1998 |

* cited by examiner

Primary Examiner—Wendy R. Garber
Assistant Examiner—Luong T Nguyen
(74) Attorney, Agent, or Firm—Greenblum & Bernstein, P.L.C.

(57) ABSTRACT

A camera-printer system comprises a still video camera provided with a release switch, and a printer provided with a print start switch. The still video camera and the printer are connected to each other. By depressing either the release switch or the print start switch once, a photographing operation is started in the still video camera. By depressing either the release switch or the print start switch again, or by initially depressing the release switch or the print start switch continuously for more than a predetermined period, a printing operation of the printer is automatically started after the photographing operation of the still video camera.

15 Claims, 8 Drawing Sheets

CAMERA-PRINTER SYSTEM

BACKGROUND OF THE INVENTION

1. Field of the Invention

The present invention relates to a camera-printer system, which has a still video camera and a printer connected thereto to print an image obtained by the still video camera.

2. Description of the Related Art

Conventionally, in a still video camera, a photographing operation is performed due to an activation of a release button, so that image data is stored in a memory provided in the still video camera. An image corresponding to the image data is reproduced or read from the memory, so that the image is indicated on a monitor device, or the image data is output to a peripheral device, such as a computer and a printer, by which the image is printed. The printer is connected to the still video camera through a cable, for example. Thus, the image data is transmitted from a memory of the camera to the printer through the cable. The printer is provided with a print start button, so that a printing operation of the image is started by an activation of the print start button.

When a photographing operation of the still video camera and a printing operation of the printer are continuously performed, after operating the release button, the print start button is operated, which is disposed at a position different from the still video camera. Therefore, when the still video camera and the printer are located at separated positions, an extended period results from the start of the photographing operation to the end of the printing operation, and thus, the operations become cumbersome.

SUMMARY OF THE INVENTION

Therefore, an object of the present invention is to provide a camera-printer system in which a photographing/printing operation, by which an image obtained by a still video camera is printed by a printer, is simplified.

According to the present invention, there is provided a still video camera connectable to a printer provided with a printing operation start mechanism that activates a printing operation, the still video camera comprising an image data generating processor, an image data generating start mechanism and an image data transmitting processor.

The image data generating processor performs, in a photography mode, a photographing operation in which image data is generated according to the image formed by an optical system. The image data generating start mechanism activates the image data generating processor. The image data transmitting processor transmits, in a reproduction mode, the image data to the printer. The image data generating processor is activatable, in the photography mode, by the printing operation start mechanism, and the image data transmitting processor is activatable, in the reproduction mode by the image data generating start mechanism, so that the printer carries out the printing operation.

Further, according to the present invention, there is provided a printer connectable to a still video camera, which performs a photographing operation in a photography mode to obtain an image and generates image data corresponding to the image, and performs a transmission operation in a reproduction mode to transmit the image data to the printer, the printer comprising an image data receiving processor, a printing processor and a printing operation start mechanism.

The image data receiving processor receives the image data from the still video camera. The printing processor prints the image corresponding to the image data received by the image data receiving processor. The printing operation start mechanism activates the printing processor. The still video camera is activatable by the printing operation start mechanism in the photography mode to perform the photographing operation.

Furthermore, according to the present invention, there is provided a camera-printer system comprising a still video camera, a printer and an image data transmission processor.

The still video camera performs, in a photography mode, a photographing operation of an image formed by an optical system to generate image data corresponding to the image by operating a release switch, and outputs the image data in a reproduction mode from the still video camera. The printer prints the image corresponding to the image data output by the still video camera, by operating a print start switch. The image data transmission processor transmits the image data to the printer. The photographing operation is performed, in the photography mode, in accordance with a first operation of one of the release switch and the print start switch, and after the photographing operation, the image is printed by the printer, in the reproduction mode, in accordance with a second operation of one of the release switch and the printing switch.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to embodiments shown in the drawings.

Figure 1:
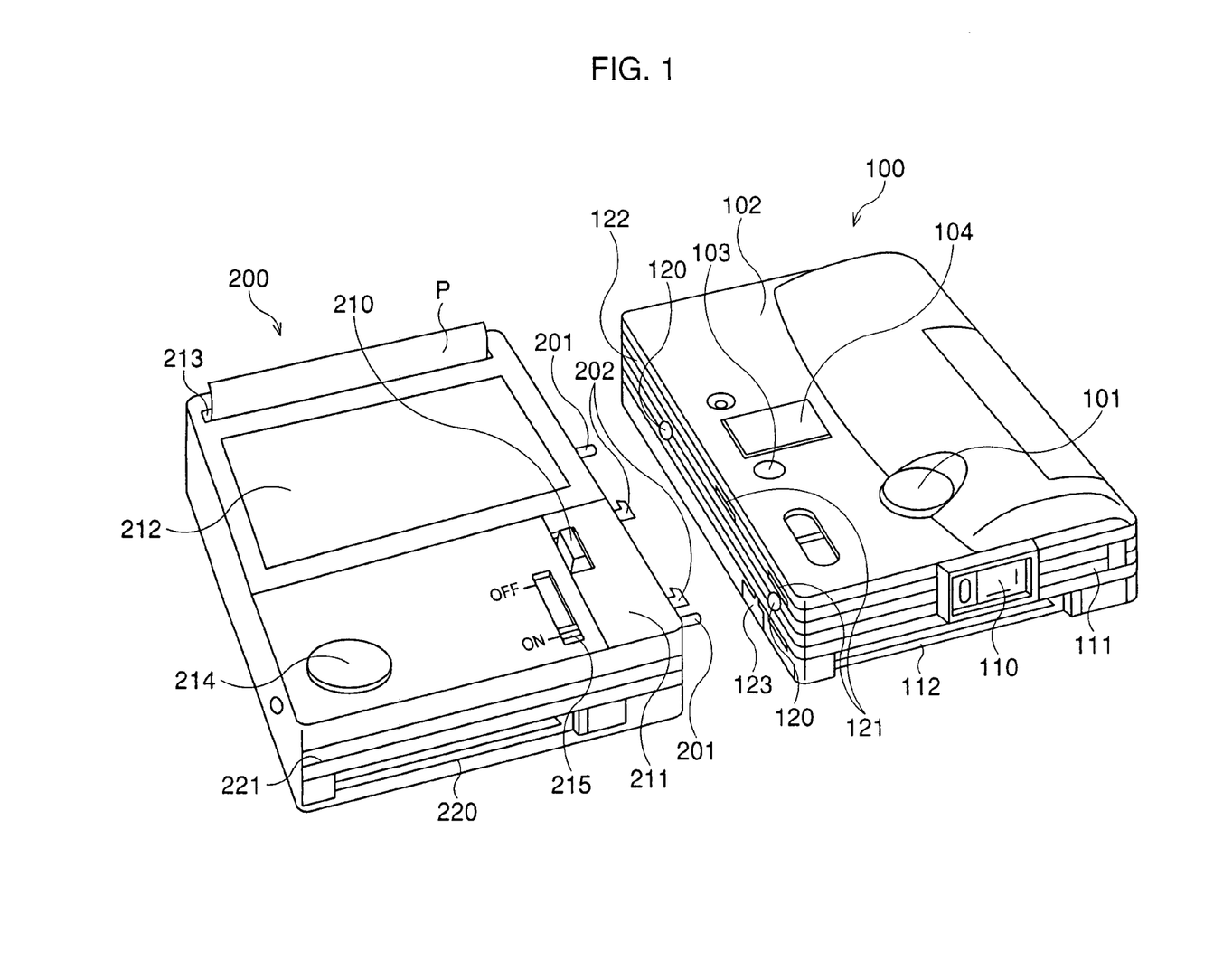
FIG. 1 is a still video camera and a detached printer.

FIG. 1 is an external view showing a still video camera 100 and a printer 200 of an embodiment of the present invention.

A release switch 101, by which a photographing operation is performed, is provided on an upper surface 102 of the still video camera 100. The release switch 101 is manually operated, and is usually in an OFF state, being turned ON when depressed. A recording mode selection switch 103 is provided on the upper surface 102, an operation of which determines whether image data is to be recorded in a memory card (not shown). A liquid crystal display 104 is also disposed on the upper surface 102, and thus, a recording mode selected by the recording mode selection switch 103 and various kinds of setting conditions of the still video camera 100 are indicated on the liquid crystal display 104.

A view finder 110 is provided on a rear surface 111 of the still video camera 100, and a photographing optical system (not shown) is provided on a front surface (not shown) opposite the rear surface 111. An object to be photographed, formed through the photographing optical system, is viewed by the operator through the view finder 110. A memory card slot 112 is formed in the rear surface 111, below the view finder 110, and the memory card can be inserted in and ejected from the memory card slot 112. When the memory card is mounted in the memory card slot 112, image data can be recorded to the memory card.

A pair of positioning holes 120 and a pair of lock paw receiving slots 121 are formed on a side surface 122 of the still video camera 100, so that the printer 200 is detachably mounted on the still video camera 100. A printer connector 123 is provided on the side surface 122 to transmit image data to the printer 200.

The printer 200 is provided with a pair of positioning pins 201 and a pair of lock paws 202 on a side surface facing the side surface 122 of the still video camera 100. The positioning pins 201 can be inserted into the positioning holes 120, and the lock paws 202 can be engaged with the lock paw receiving slots 121. The lock paws 202 are spring-mounted L-shaped plates resiliently-biased toward a front surface of the printer 200, corresponding to the front surface of the camera 100, and are movable in the longitudinal direction of the side surface of the printer 200 by depressing and releasing a lock release switch 210 provided on an upper surface 211 of the printer 200.

During the attachment of the printer 200 to the still video camera 100, as the positioning pins 201 are aligned and inserted into the positioning holes 120, the sprung lock paws 202 are displaced toward a rear surface 221 of the printer 200 due to a partially-angled leading edge of the lock paws 202 by a catch-mechanism (not shown) in the lock paw receiving slots 121. Upon attachment, the lock paws 202 are restored to an initial position due to the spring-mounting and firmly engage the catch-mechanism within the lock paw receiving slots 121, thereby the printer 200 is connected and locked to the still video camera 100. In this state, a camera connector 231 (see FIG. 3), provided in the printer 200, is connected to the printer connector 123 of the still video camera 100.

When the printer 200 is released from the still video camera 100, the lock release switch 210 is depressed to retract the sprung lock paws 202 toward the rear surface 221 from the catch-mechanism of the lock paw receiving slot 121, so that the lock paws 202 are released from the lock paw receiving slots 121. Then, the printer 200 can be detached from the camera 100 by removing the lock paws 202 and the positioning pins 201 from the lock paw receiving slots 121 and the positioning holes 120, respectively.

A memory card slot 220 is formed on the rear surface 221 of the printer 200. A memory card (not shown) can be inserted in and ejected from the memory card slot 220. When the memory card is attached in the memory card slot 220, image data, which is recorded on the memory card by the still video camera 100, is read from the memory card, so that the image corresponding to the image data can be printed. Namely, even when the printer 200 is detached from the still video camera 100, the image data can be transferred between the still video camera 100 and the printer 200 through the memory card.

A liquid crystal display 212 is provided on the upper surface 211 of the printer 200, so that an image, corresponding to the image data input through the memory card or the camera connector 231, can be indicated on the display 212. An eject slot 213 is formed on an edge portion of the upper surface 211 to discharge printing sheet P through the eject slot 213.

A print start switch 214 is provided on the upper surface 211. By depressing the print start switch 214, a printing operation of an image obtained by the still video camera 100 is performed. A main switch 215, which is a slide switch for supplying electric power to the printer 200, is provided beside the lock paw release switch 210 on the upper surface 211. When the main switch 215 is set to an OFF state, the electric power of the printer 200 is cut off, and when the main switch 215 is set to an ON state, the electric power is supplied to the printer 200.

Figure 2:
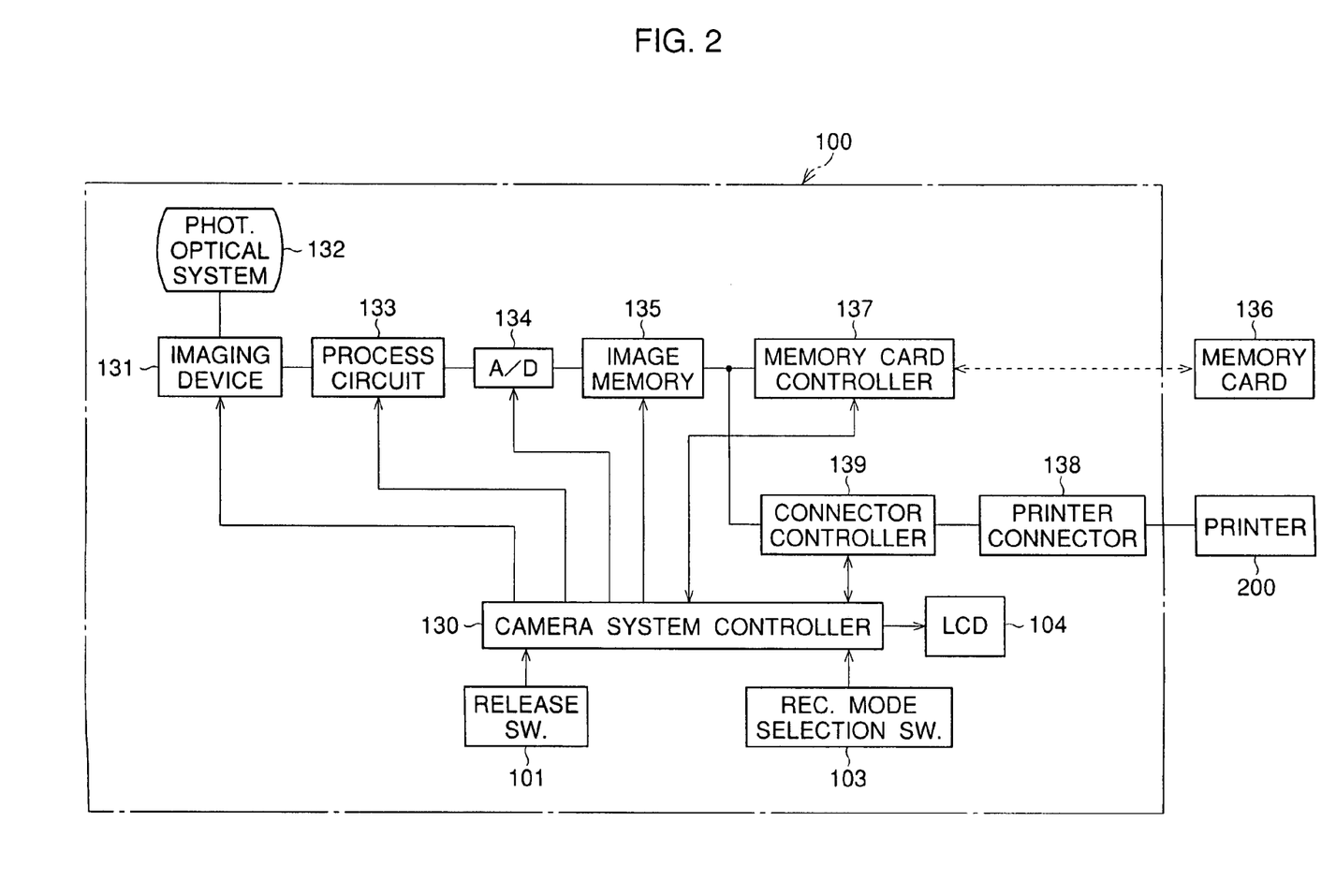
FIG. 2 is a block diagram of the still video camera.

FIG. 2 is a block diagram of the still video camera 100.

The still video camera 100 is provided with a camera system controller 130, which is a micro-computer, by which the still video camera 100 is controlled as a whole. The release switch 101 is connected to the camera system controller 130. When the release switch 101 is depressed and the camera system controller 130 senses that the release switch 101 is turned ON, a photographing operation is performed under control of the camera system controller 130, as described below.

Namely, an object image is formed on a light receiving surface of the imaging device 131 by the photographing optical system 132, and thus an optical signal corresponding to the object image is photo-electrically converted to an electronic signal by the imaging device 131. The electronic signal, which is an analog image signal output from the imaging device 131, is input to a process circuit 133, in which the image signal is subjected to a predetermined process such as a level shift. Then, the image signal is converted to a digital signal in an A/D converter 134. The digital image signal, corresponding to one frame image, is subjected to processes, such as a color-separation and a gamma correction, and then, is separated into a color difference signal and a luminance signal. The image data, such as the color difference signal and the luminance signal, is then stored in an image memory 135, which has a capacity sufficient to store more than one frame image and thus the photographing operation is completed.

On the other hand, the recording mode selection switch 103 is connected to the camera system controller 130. When it is designated by the recording mode selection switch 103 that the image data is to be recorded in a memory card 136, the image data stored in the image memory 135 is output to a memory card controller 137, one frame image by one frame image, under control of the camera system controller 130. The image data of one frame image is converted to a predetermined recording format by the memory card controller 137, and is then recorded in a predetermined recording area of the memory card 136, which is connected to the memory card controller 137.

A printer connector 138 is provided for connecting the printer 200 to the still video camera 100. A connector controller 139 is connected to the printer connector 138, the camera system controller 130 and the image memory 135, so that the image data stored in the image memory 135 is converted to a predetermined recording format by the connector controller 139, and is transmitted to the printer 200 through the printer connector 138.

The still video camera 100 can be operated in a photography mode and a reproduction mode. In the photography mode, a photographing operation is carried out so that an object image is photographed, and image data corresponding to the image is generated and stored in the image memory 135. Immediately after electric power is supplied to the electric circuit of the still video camera 100, the photography mode is automatically set, and when a photographing operation is carried out by depressing the release switch 101, the photography mode is canceled and the reproduction mode is automatically set, in which the image data is transmitted to the printer 200.

Figure 3:
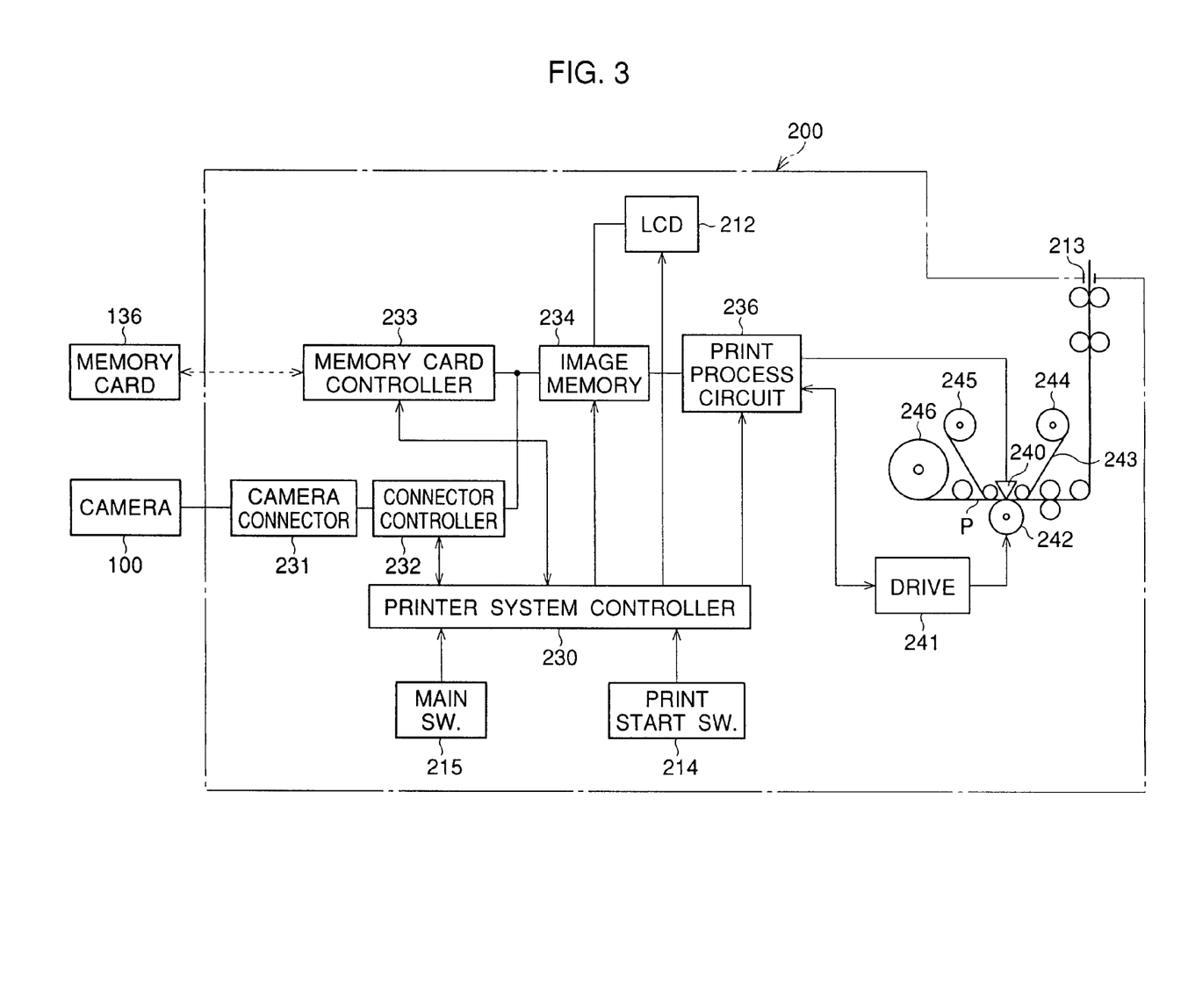
FIG. 3 is block diagram of the printer.

FIG. 3 is a block diagram of the printer 200.

The printer 200 is provided with a printer system controller 230, which is a micro-computer, by which the printer 200 is controlled as a whole. The main switch 215 and the print start switch 214 are connected to the printer system controller 230. When the print start switch 214 is depressed and the printer system controller 230 senses that the print start switch 214 is turned ON, a reading operation of an image and a printing operation are performed under control of the printer system controller 230, as described below.

There are two ways by which the reading operation is carried out. The first is that image data is input from the still video camera 100 through the printer connector 138, and the second is that image data is read and input from the memory card 136.

To input image data from the still video camera 100 through the printer connector 135, the printer 200 is provided with a camera connector 231 and a connector controller 232. When it is sensed that the printer 200 is connected to the still video camera 100, i.e., that the camera connector 231 is connected to the printer connector 138, and the printer 200 requests the still video camera 100 to transmit image data to the printer 200, the image data is transmitted from the printer connector 138 to the camera connector 231 under control of the printer system controller 230.

To input image data from the memory card 136, the printer 200 is provided with a memory card controller 233. When it is sensed that the memory card 136 is mounted in the memory card slot 220 (see FIG. 1), the memory card controller 233 reads the image data recorded in the memory card 136 under control of the printer system controller 230.

Thus, the image data generated by the still video camera 100 can be received by the printer 200 through the memory card 136 or the camera connector 231.

A construction for performing the printing operation is described below. Namely, an image memory 234 is connected to the printer system controller 230, so that print image data is generated in association with the image memory 234, based on the image data read by the printer system controller 230, and is stored in the image memory 234. The print image data is read from the image memory 234 to a print process circuit 236, by which a print mechanism is controlled, and is converted therein to a predetermined format which is in conformity with the printer 200.

The print mechanism is provided with a thermal head 240 and a drive mechanism 241, which are connected to the print process circuit 236. The drive mechanism 241 is connected to a platen roller 242, which, in association with the thermal head 240, sandwiches a thermal ribbon 243. Both ends of the thermal ribbon 243 are wound as a used roll 244 and an unused roll 245, respectively. A printing sheet P is interposed between the thermal ribbon 243 and the platen roller 242, and one end of the printing sheet P is wound as a printing sheet roll 246.

A control signal is output based on the printing image data, from the printer system controller 230 to the print process circuit 236. In accordance with the control signal, the thermal head 240 is driven so that an image is printed on the printing sheet P. In the printing operation, due to a rotation of the platen roller 242 based on the control of the drive mechanism 241, the printing sheet P is released from the printing sheet roll 246, and the thermal ribbon 243 is released from the unused roll 245 and wound by the used roll 244. The printing sheet P, in which the printing operation has been completed, is led to the eject slot 213 and discharged therefrom. Thus, the printing operation ends.

While the printing operation is carried out, the print image data is also transferred to the display 212, by which the image corresponding to the print image data is indicated, so that the user can preview the image.

Figure 4:
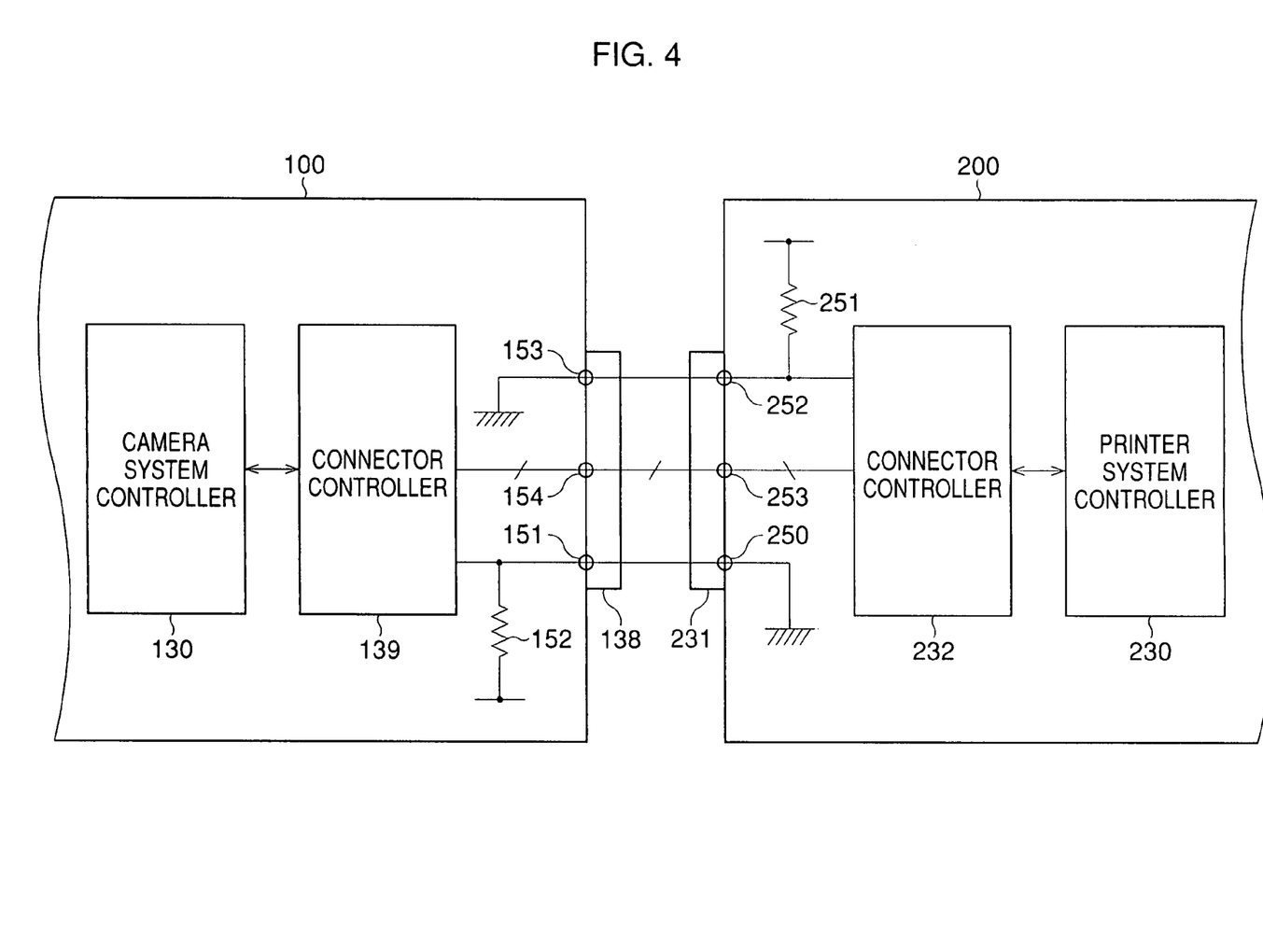
FIG. 4 is a block diagram showing a sensing system that senses in connection of the printer to the still video camera.

FIG. 4 is a block diagram showing a sensing system that senses a connection of the printer 200 to the still video camera 100.

In the still video camera 100, the connector controller 139 is connected to a connecting terminal 151 of the printer connector 138, and an end of a resistor 152 is connected to the connection between the connector controller 139 and the connecting terminal 151. A predetermined voltage is applied to another end of the resistor 152. In a state in which the still video camera 100 is connected to the printer 200, the connecting terminal 151 of the still video camera 100 is connected to a connecting terminal 250 of the camera connector 231. The connecting terminal 250 is grounded.

Accordingly, when the camera connector 231 is connected to the printer connector 138, the voltage across the resistor 152 becomes low, since the connecting terminal 151 is grounded. As a result, the camera system controller 130 senses, through the connector controller 139, that the voltage of the resistor 152 is low, and thus it is recognized by the camera system controller 130 that the printer 200 is connected to the still video camera 100.

The printer 200 has a construction similar to the still video camera 100. Namely, a resistor 251, corresponding to the resistor 152, has an end connected to a connection between the connector controller 232 and a connecting terminal 252 of the camera connector 231. A predetermined voltage is applied to another end of the resistor 251. Therefore, when the still video camera 100 is connected to the printer 200, the connecting terminal 252 of the printer 200 is connected to a grounded connecting terminal 153 of the printer connector 138.

Accordingly, when the camera connector 231 is connected to the printer connector 138, the voltage of the resistor 251 becomes low, and thus, it is recognized by the printer system controller 230 that the printer 200 is connected to the still video camera 100.

The printer connector 138 of the still video camera 100 is provided with an image terminal 154, which is connected to an image terminal 253, provided in the camera connector 231, when the printer 200 is connected to the still video camera 100. Therefore, image data is transmitted from the still video camera 100 to the printer 200 through the image terminals 154 and 253, in accordance with a command output from the printer 200.

Data communication between the still video camera 100 and the printer 200 is carried out through the connector controllers 139 and 232, regardless of the photographing operation and the printing operations, whenever the electric power is turned ON in each of the still video camera 100 and the printer 200. Namely, when the print start switch 214 is depressed, a start signal is output from the printer 200, and is transmitted to the camera 100 through the printer connector 138 and the camera connector 231, so that a photography mode signal is output from the camera 100 to the printer 200 in accordance with a start signal of the photography mode, and a reproduction mode signal is output from the camera 100 to the printer 200 in accordance with a start signal of the reproduction mode.

Data, such as the photography mode signal and an image-data-transmission command signal output when the image transmission command is output by the printer 200, is stored in a receiving data storing area (not shown) of a memory provided in each of the system controllers 130 and 230. Each of the memories has a sending data storing area (not shown), in addition to the receiving data storing area. Data, indicating an operation mode of the still video camera 100 and an operating condition of the release switch 101, is stored in the sending data storing area of the memory of the camera system controller 130. The camera system controller 130 recognizes an operation mode of the printer 200 and an operating condition of the print start switch 214, which cannot be directly sensed by the still video camera 100, based on data stored in the receiving data storing area, and renews data, stored in the sending data storing area, in accordance with the operating condition of the release switch 101 and the operation mode. The printer system controller 230 operates in a similar way as the camera system controller 130.

When the printer 200 is connected to the still video camera 100, the photographing operation of the still video camera 100 and the printing operation of the printer 200 can be performed by operating the release switch 101 of the still video camera 100. Namely, by depressing the release switch 101 twice or continuously for more than a predetermined period, a photographing operation of the still video camera 100 and a printing operation of the printer 200 are successively carried out. In this case, after the photographing operation is completed, a print start signal is sent by the still video camera 100 to the printer 200, so that an image reading operation and a printing operation are started by the printer 200.

Similarly, the printing operation of the printer 200 and the photographing operation of the still video camera 100 can be performed by operating the print start switch 214 of the printer 200. Namely, by depressing the print start switch 214 twice or continuously for more than a predetermined period, a photographing operation of the still video camera 100 and a printing operation of the printer 200 are successively carried out. In this case, a signal indicating that the print start switch 214 is turned ON is sent by the printer 200 to the still video camera 100, so that a photographing operation is started by the still video camera 100. When the reproduction mode signal, indicating that the photographing operation of the still video camera 100 is completed, is output from the still video camera 100, an image reading operation and a printing operation are started in the printer 200.

Further, when the release switch 101 and the print start switch 214 are successively depressed once, the photographing operation and the printing operation are carried out successively. When the print start switch 214 is depressed after the release switch 101 is depressed, after the photographing operation, the reproduction mode signal is output from the still video camera 100 in response to a signal indicating that the print start switch 214 is turned ON, so that an image reading operation and a printing operation are started in the printer 200. Conversely, when the release switch 101 is depressed after the print start switch 214 is depressed, a photographing operation is started by the still video camera 100 in response to a signal indicating that the print start switch 214 is turned ON. After the photographing operation, the print start signal is output by the still video camera 100, so that an image reading operation and a printing operation are started in the printer 200.

As described above, when the printer 200 is connected to the still video camera 100, by an operation either the still video camera 100 or the printer 200, a photographing operation and a printing operation can be successively performed.

Figure 5A:
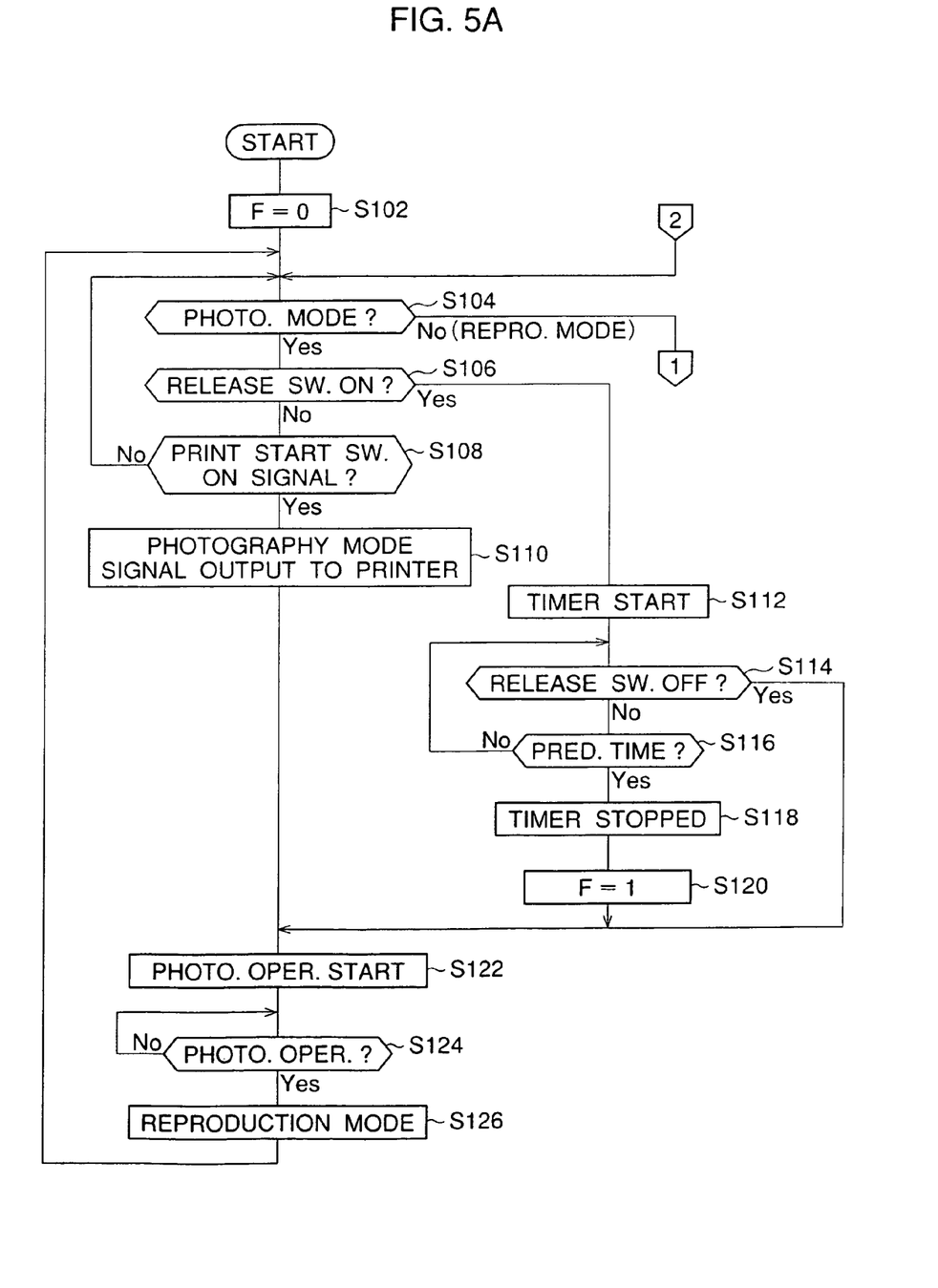
FIGS. 5A and 5B show a flowchart of an operation of a camera system controller of the still video camera.
Figure 5B:
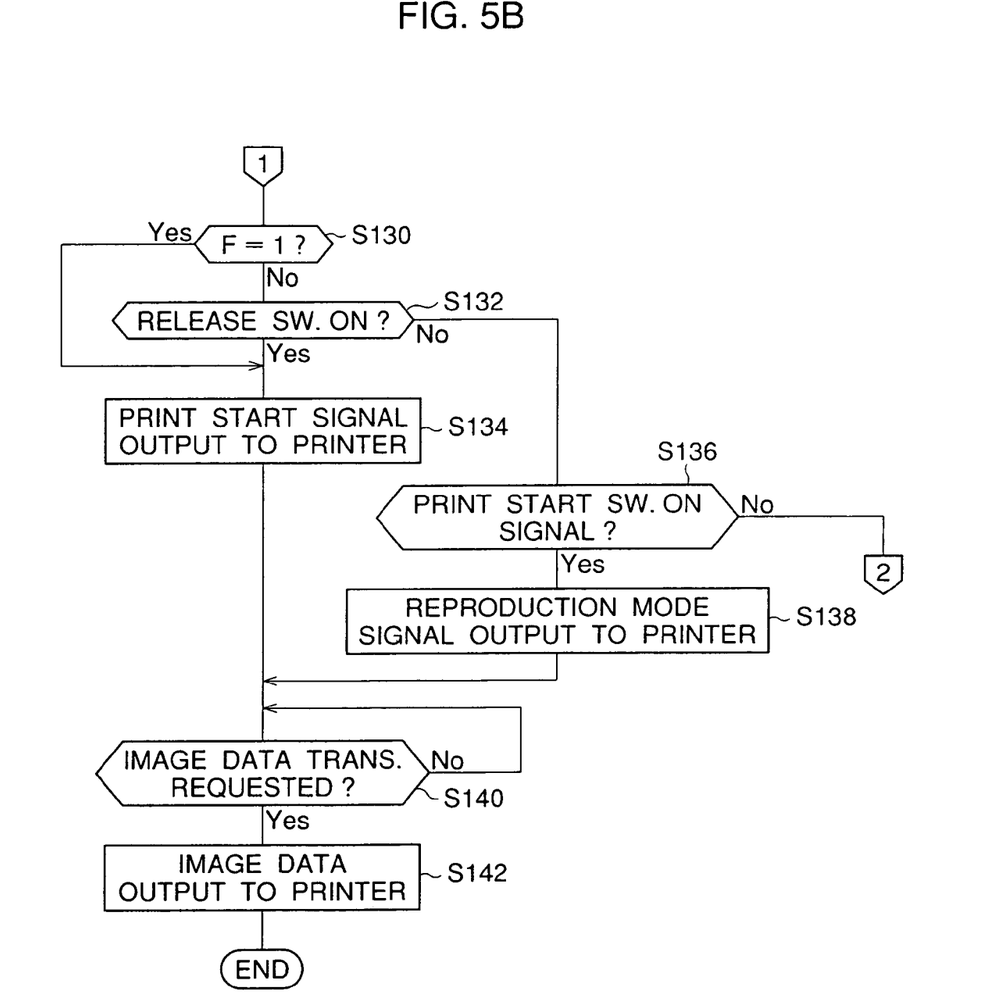

FIGS. 5A and 5B show a flowchart of an operation of the camera system controller 130 of the still video camera 100. When the electric power is supplied to the still video camera 100 to start an operation of the camera 100, an initial value of a flag F is set to 0 in Step S102. Note that, immediately after the electric power is turned ON, the still video camera 100 is automatically set to the photographing mode.

In Step S104, it is determined whether the photographing mode is set. When it is determined that the photographing mode is set after the turning ON of the electric power supply, it is determined in Step S106 whether the release switch 101 is turned ON, and it is determined in Step S108 whether a signal, indicating that the print start switch 214 is turned ON, is sensed. As described above, data indicating the operating condition of the print start switch 214 is stored in the receiving data storing area of the camera system controller 130, and by referring to the data, it is determined whether the print start switch 214 is turned ON.

When the photography mode has just been started and the release switch 101 and the print start switch 214 are not turned ON, Steps S104, S106 and S108 are repeatedly executed. While Steps S104, S106 and S108 are executed, if the release switch 101 is depressed, the process goes from Step S106 to Step S112, and if it is sensed that the print start switch 214 is depressed, the process goes from Step S108 to Step S110.

In Step S110, the photography mode signal is output to the printer 200. Namely, in accordance with the sensing that the print start switch 214 is turned ON, the printer 200 receives a signal indicating that the photographing operation is to be performed in the still video camera 100, or that the photographing operation has yet to be completed.

In Step S112, a timer (not shown) is started in the camera system controller 130, so that a period for which the release switch 101 is turned ON is detected. It is determined in Step S114 whether the release switch 101 is turned OFF, and it is determined in Step S116 whether a predetermined period of the timer has passed. If the release switch 101 remains turned ON during the predetermined period, Steps S114 and S116 are repeatedly executed. If the release switch 101 remains turned ON in excess of the predetermined period, then the timer is stopped in Step S118. Step S120 is then executed in which the flag F is changed from 0 to 1, and then, Step S122 is executed. Conversely, if the release switch 101 is turned OFF before the predetermined period has passed, the process moves from Step S114 to Step S122, and the flag F is kept to 0.

Thus, when the release switch 101 is depressed for less than the predetermined period, the process goes to Step S122 while the flag F is kept to 0, and when the release switch 101 is depressed continuously for more than the predetermined period, the process goes to Step S122 through Steps S118 and S120. On the other hand, when the print start switch 214 is turned ON, the flag F is kept to 0, and after the photography mode signal is output to the printer 200 in Step S110, the process goes to Step S122.

In Step S122, the photographing operation is started, and in Step S124, it is determined whether the photographing operation has been completed. Step S124 is repeatedly executed until the photographing operation is completed. When it is determined in Step S124 that the photographing operation has been completed, the photography mode is canceled and the reproduction mode is automatically set, and then the process goes from Step S104 to Step S130.

In Step S130, it is determined whether the flag F is set to 1. When the flag F is 1, i.e., when the release switch 101 has been depressed continuously for more than the predetermined period, the print start signal, which is a command signal for performing a printing operation subsequent to a photographing operation, is output to the printer 200 in Step S134, and then Step S140 is carried out. Thus, by depressing the release switch 101 for more than the predetermined period, a photographing operation and a printing operation of the image obtained by the photographing operation are successively carried out.

Conversely, when it is determined in Step S130 that the flag F is 0, i.e., when it is determined that either the release switch 101 or the print start switch 214 has been depressed only once for less than the predetermined period, Step S132 is executed, in which it is determined whether the release switch 101 is turned ON. Then, in Step S136, it is determined whether a signal, indicating that the print start switch 214 is turned ON, is sensed. When neither the release switch 101 nor the print start switch 214 is depressed, a loop composed of Steps S104, S130, S132 and S136 is repeatedly executed. Thus, after the electric power is turned ON, when either the release switch 101 or the print start switch 214 is depressed only once, only a photographing operation is performed.

Conversely, after the photographing operation, when the release switch 101 is again depressed, the process goes from Step S132 to Step S134, and when the print start switch 214 is depressed, the process goes from Step S136 to Step S138.

In Step S138, the reproduction mode signal is output to the printer 200, indicating that the photographing operation has been completed in the still video camera 100, and a printing operation is to be automatically carried out subsequent to the photographing operation in the printer 200.

Namely, when the release switch 101 is depressed twice, is continuously depressed for more than a predetermined period, or is depressed after the print start switch 214 has been depressed, the print start signal is output to the printer 200 in Step S134, and Step S140 is then executed. Conversely, when the print start switch 214 is depressed after the release switch 101 is depressed, the reproduction mode signal is output to the printer 200 in Step S138, and Step S140 is then executed.

In Step S140, it is determined whether an image-data-transmit command signal has been received by the still video camera 100 to transmit the image data to the printer 200. When the command signal has not been output from the printer 200 to the still video camera 100, Step S140 is repeatedly executed. When the command signal is output, Step S142 is executed in which the reproduced image data is output to the printer 200, and the operation of the still video camera 100 ends.

Figure 6A:
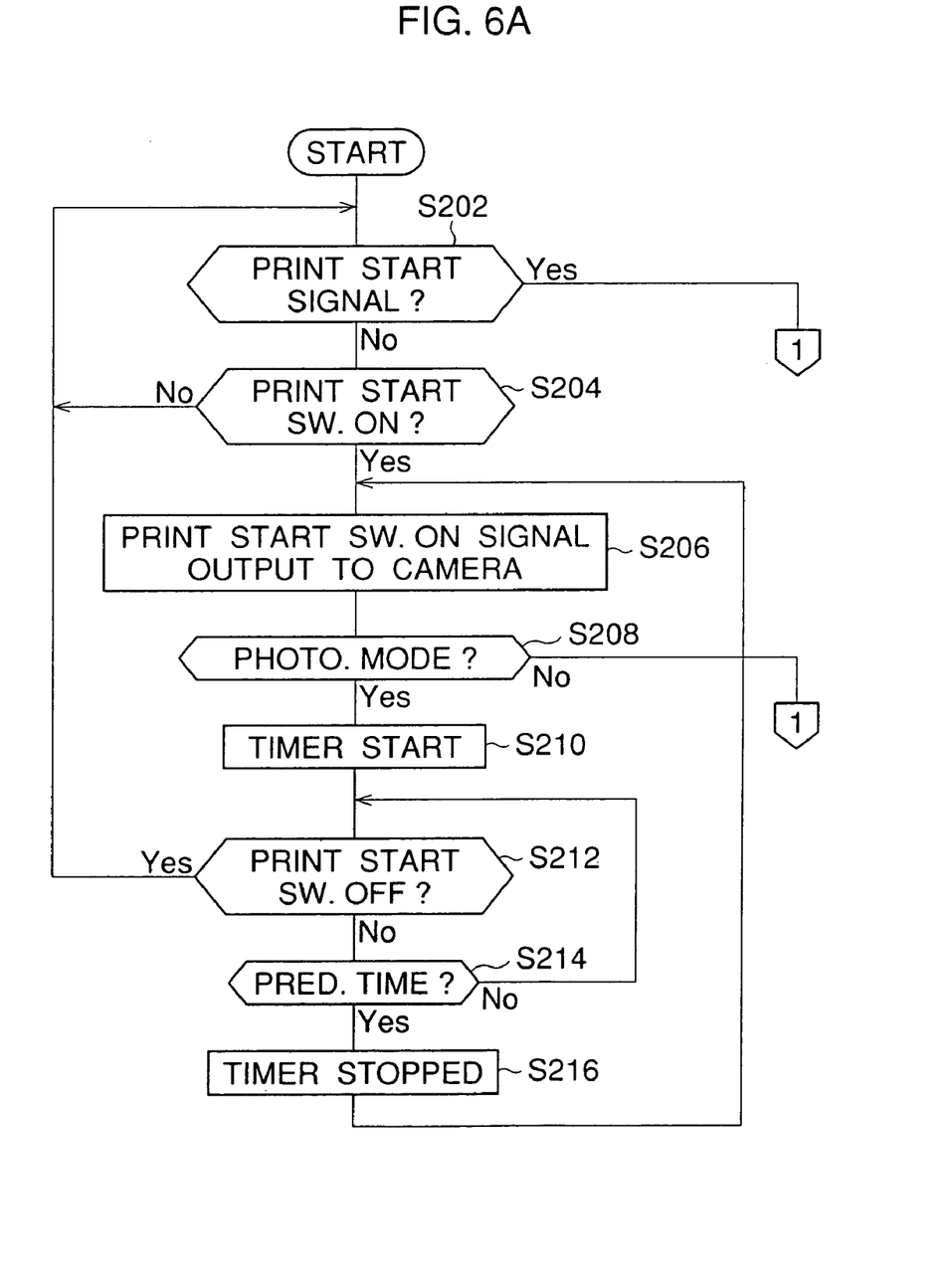
FIGS. 6A and 6B show a flowchart of an operation of a printer system controller of the printer.
Figure 6B:
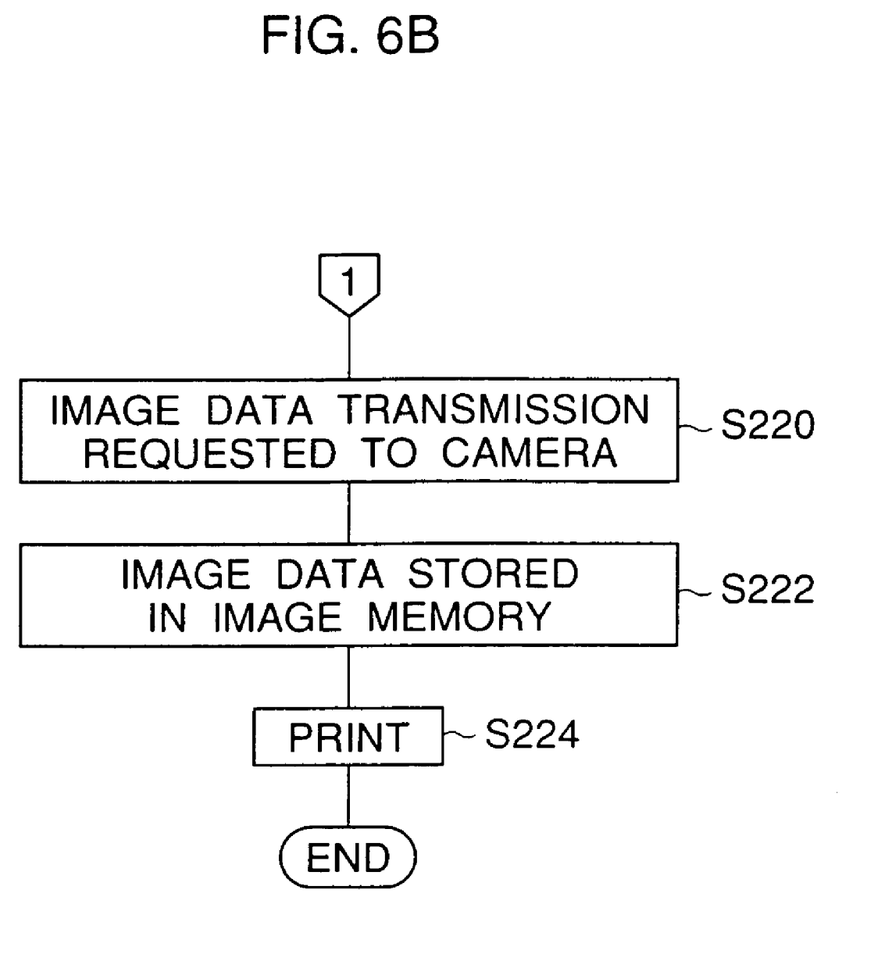

FIGS. 6A and 6B show a flowchart of an operation of the printer system controller 230 of the printer 200. When electric power is supplied to the printer 200, the operation of the printer 200 is started, and it is determined in Step S202 whether the print start signal has been output from the still video camera 100. When the release switch 101 is depressed twice, is continuously depressed for more than a predetermined period, or is depressed after the print start switch 214 is depressed, the print start signal is output, and thus, the process goes from Step S202 to Step S220.

In Step S220, the command signal is output to the still video camera 100 to transmit the image data to the printer 200. In Step S222, in response to the command of the printer 200, the image data is transmitted from the still video camera 100 to the printer 200 through the camera connector 231, and is stored in the image memory 234. In Step S224, based on the image data stored in the image memory 234, a printing operation is carried out in the print process circuit 236, and an image corresponding to the image data is indicated on the liquid crystal display 212. Thus, the printing operation by the print system controller 230 ends.

When it is determined in Step S202 that the print start signal is not sensed, i.e., when neither the release switch 101 nor the print start switch 214 has been depressed, or when either the release switch 101 or the print start switch 214 has been depressed only once, Step S204 is executed, in which it is determined whether the print start switch 214 is now turned ON. When it is determined that the print start switch 214 is turned OFF, Step S202 is executed again. Conversely, when it is determined that the print start switch 214 is now turned ON, Step S206 is executed in which a signal indicating that the print start switch 214 is turned ON is output to the still video camera 100.

When the print start switch ON signal is output in Step S206, while in the still video camera 100 the release switch 101 has not been depressed and the loop composed of Steps S104, S106 and S108 is repeatedly executed, the process goes from Step S108 to Step S110 so that the photography mode signal is output to the printer 200 (see FIG. 5A). Conversely, when the print start switch ON signal is output in Step S206, while in the still video camera 100 the release switch 101 has been depressed once and Step S206 is being executed during the execution of the loop composed of Steps S104, S130, S132 and S136, the process goes from Step S136 to Step S138 so that the reproduction signal is output to the printer 200 (see FIG. 5B).

In Step S208, it is determined whether the photography mode is set in the still video camera 100, i.e., whether either the photography mode signal or the reproduction mode signal has been input to the printer 200. When the photography mode is set in the still video camera 100, i.e., when the print start switch 214 has been depressed only once, Step S210 is executed. Conversely, when the reproduction mode has been set in the still video camera 100, i.e., when the print start switch 214 is depressed after the release switch 101 has been depressed, Step S220 is executed.

In Step S210, a timer (not shown) provided in the printer system controller 230 is started, so that a time for which the print start switch 214 is continuously depressed is sensed. It is determined in Step S212 whether the print start switch 214 is turned OFF, and it is determined in Step S214 whether a predetermined time has elapsed since the timer was started. When Steps S212 and S214 are repeatedly executed until the predetermined time has elapsed, the process goes from Step S214 to Step 216, in which the timer is stopped.

At this time, in the still video camera 100, by sensing a signal indicating that the print start signal 214 is turned ON in the photography mode, it is determined in Step S108 in FIG. 5A that the print start switch ON signal has been output, and thus a photographing operation is started in Step S122. In the printer 200, following the elapsed predetermined time, the process goes from Step S216 to Step S206, in which another print start switch ON signal indicating that the print start switch 214 is turned ON is output. As a result, in the still video camera 100, it is now determined in Step S136 of FIG. 5B that the signal, indicating that the print start switch 214 is turned ON, has been output, and thus the process goes from Step S136 to Step S138, in which the reproduction mode signal is output to the printer 200. Therefore, in the printer 200, it is now determined in Step S208 that the reproduction mode is set, and Step S220 is executed.

Thus, when the print start switch 214 is continuously depressed for more than a predetermined period when the still video camera 100 is set to the photography mode, after the photographing operation (i.e., after the execution of Steps S204, S206, S208, S210, S212, S214 and S216), the still video camera 100 is automatically set to the reproduction mode (Steps S206 and S208 again), and the printing operation is then executed (Steps S220, S222 and S224).

On the other hand, when it is determined in Step S212 that the print start switch 214 is now turned OFF, i.e., when it is determined that the print start switch 214 is depressed only once, Step S202 is executed again. When it is determined in Step S202 that the print start signal is not sensed, i.e., when it is determined that the release switch 101 is not depressed in the still video camera 100, it is determined in Step S204 whether the print start switch 214 is turned ON. When it is determined that the print start switch 214 is now turned ON, i.e., when the print start switch 214 is depressed a second time, Steps S206 and S208 are again executed. In Step S208, it is determined that the reproduction mode is now set, and thus, Step S220 is executed.

As described above, in the printer 200, a printing operation can be performed by the operation of the print start switch 214 and the release switch 101, when the printer 200 is connected to the still video camera 100. There are six ways by which the printing operation can be performed, as follows: by depressing the release switch 101 continuously for more than the predetermined period; by depressing the release switch 101 twice; by depressing the print start switch 214 after depressing the release switch 101; by depressing the print start switch 214 continuously for more than the predetermined period; by depressing the print start switch 214 twice; by depressing the release switch 101 after depressing the print start switch 214. By any one of the six ways, the photographing operation of the still video camera 100 and the printing operation of the printer 200 can be carried out sequentially.

Thus, by operating a single switch, which may be the print start switch 214 or the release switch 101, the photographing operation and the printing operation can be carried out. Namely, even if the still video camera 100 is separated from the printer 200 via a cable attachment interconnecting the printer connector 138 and the camera connector 231, the photographing operation and the printing operation can be performed without it being necessary for an operator to move between the still video camera 100 and the printer 200. Consequently, a time from a start of the photographing operation to a completion of the printing operation can be shortened, and thus, there is no complicated or troublesome handling required.

Note that the printing mode may be automatically changed to the photography mode, or the photography mode may be returned from the printing mode by operating the recording mode selection switch 103.

Further, the photographing operation of the still video camera 100 can also be carried out using the print start switch 214. Namely, the photographing operation can be performed by depressing either the release switch 101 or the print start switch 214. Therefore, even if the still video camera 100 and the printer 200 are located at the aforementioned separate positions, the photographing operation can still be carried out by a single operation of the printer 200.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-99126 (filed on Apr. 10, 1998) which is expressly incorporated herein, by reference, in its entirety.

What is claimed is:

1. A still video camera connectable to a printer, comprising:
   an image data generating processor that performs, in a photography mode, a photographing operation in which image data is generated according to an image formed by an optical system;
   an image data generating start mechanism, of said still video camera, that activates said image data generating processor; and
   an image data transmitting processor that transmits, in a reproduction mode, said image data to said printer, said image data generating start mechanism being operated in accordance with one of a first operation and a second operation which is different from said first operation, so that said photography mode is set, and said reproduction mode is then automatically set, whereby said printer carries out a printing operation.

2. A still video camera according to claim 1, wherein said image data generating start mechanism comprises a release switch depressible to activate said photographing operation.

3. A still video camera according to claim 1, wherein an image corresponding to image data obtained by said photographing operation is printed by said printer.

4. A still video camera according to claim 1, wherein said first operation comprises a continuous operation over a predetermined period of said image data generating start mechanism.

5. A still video camera according to claim 1, wherein said second operation comprises plural depressions of said image data generating start mechanism.

6. A printer connectable to a still video camera, that performs a photographing operation in a photography mode to obtain an image and generates image data corresponding to said image, and performs a transmission operation in a reproduction mode to transmit said image data to said printer, said printer comprising:
   an image data receiving processor that receives said image data from said still video camera;
   a printing processor that prints said image corresponding to said image data received by said image data receiving processor; and
   a printing operation start mechanism that activates said printing processor, said printing operation start mechanism being operated in accordance with one of a first operation and a second operation which is different from said first operation, so that said photography mode is set, and said reproduction mode is then automatically set, said first operation and said second operation each setting said photography mode and said reproduction mode, only one of said first operation and said second operation being required to set said photography mode and said reproduction mode.

7. A printer according to claim 6, wherein said printing operation start mechanism comprises a print start switch depressible to activate a printing operation of said printing processor.

8. A printer according to claim 6, wherein an image corresponding to image data obtained by said photographing operation is printed by said printer.

9. A printer according to claim 6, wherein said first operation comprises a continuous operation over a predetermined period of said printing operation start mechanism.

10. A printer according to claim 6, wherein said second operation comprises plural depressions of said printing operation start mechanism.

11. A camera-printer system, comprising:
- a still video camera that performs, in a photography mode, a photographing operation of an image formed by an optical system to generate image data corresponding to said image, and outputs said image data in a reproduction mode, said still video camera being provided with a first switch;
- a printer that prints said image corresponding to said image data output by said still video camera, said printer being provided with a second switch; and
- an image data transmission processor that transmits said image data to said printer,
- one of said first switch and said second switch being operated in accordance with one of a first operation and a second operation which is different from said first operation, so that said photography mode is set, and said reproduction mode is then automatically set, whereby said printer carries out a printing operation, each of said first operation and said second operation setting said photography mode and said reproduction mode, only one of said first operation and said second operation being required to set said photography mode and said reproduction mode.

12. A camera-printer system according to claim 11, wherein said first switch comprises a release switch depressible to activate said photographing operation.

13. A camera-printer system according to claim 11, wherein said second switch comprises a print start switch depressible to activate a printing operation of said printer.

14. A camera-printer system according to claim 11, wherein said first operation comprises a continuous operation over a predetermined period of one of said first and second switches.

15. A camera-printer system according to claim 11, wherein said second operation comprises plural depressions of one of said first switch and said second switch.

* * * * *